United States Patent
Nicolas Haro et al.

(10) Patent No.: US 11,519,804 B2
(45) Date of Patent: Dec. 6, 2022

(54) PRESSURE AND TEMPERATURE MEASURING DEVICE WITH IMPROVED COMPACT DESIGN AND INSTALLATION

(71) Applicant: CEBI ELECTROMECHANICAL COMPONENTS SPAIN, S.A., Navarra (ES)

(72) Inventors: Lesmes Nicolas Haro, Navarra (ES); Javier Garcia Izaguirre, Navarra (ES); Sergio Diez Garcia, Navarra (ES)

(73) Assignee: CEBI ELECTROMECHANICAL COMPONENTS SPAIN, S.A., Navarra (ES)

( * ) Notice: Subject to any disclaimer, the term of this patent is extended or adjusted under 35 U.S.C. 154(b) by 0 days.

(21) Appl. No.: 17/345,413

(22) Filed: Jun. 11, 2021

(65) Prior Publication Data
US 2021/0396618 A1 Dec. 23, 2021

(30) Foreign Application Priority Data
Jun. 17, 2020 (ES) .................. P202030585

(51) Int. Cl.
*G01L 9/00* (2006.01)
*G01L 19/00* (2006.01)

(52) U.S. Cl.
CPC ........ *G01L 19/0092* (2013.01); *G01L 9/0041* (2013.01)

(58) Field of Classification Search
None
See application file for complete search history.

(56) References Cited

U.S. PATENT DOCUMENTS

| | | | | |
|---|---|---|---|---|
| 5,583,294 A | * | 12/1996 | Karas | G01L 13/026 73/717 |
| 6,981,422 B1 | * | 1/2006 | Comardo | G01M 3/3227 73/756 |
| 8,935,961 B2 | * | 1/2015 | Papadeas | G01L 19/0092 73/714 |
| 2005/0034523 A1 | * | 2/2005 | Casimiro | G01L 19/0007 73/715 |
| 2009/0241943 A1 | * | 10/2009 | Schwank | F24C 3/08 126/91 A |

FOREIGN PATENT DOCUMENTS

EP 2559987 A2 2/2013

* cited by examiner

*Primary Examiner* — Lisa M Caputo
*Assistant Examiner* — Nigel H Plumb
(74) *Attorney, Agent, or Firm* — Lucas & Mercanti, LLP

(57) ABSTRACT

A pressure and temperature measuring device with improved compact design and installation having a base (1) with an elongated geometry, arranged according to the longitudinal axis (A) inside the casing (16) and having a partition (5), a back (18), a platform (19) and a plinth (10); the partition (5) has an inner plane (5') oriented towards the back (18) and parallel to the longitudinal axis (A) and an outer plane (5") that forms an acute angle with the inner plane (5'), the back (18), the platform (19) and the inner plane (5') of the partition (5) define a slot (17) and receives the electronic circuit board (3), the outer plane (5") of the partition (5) defines a support surface to support together with the plinth (10) for the pressure-sensitive element (2), the outer surface (5") of the partition (5) having an opening (7) that gives way to the conduit (8).

15 Claims, 7 Drawing Sheets

PRESSURE AND TEMPERATURE MEASURING DEVICE WITH IMPROVED COMPACT DESIGN AND INSTALLATION

CROSS-REFERENCE TO RELATED APPLICATION

This application claims the benefit of priority of Spanish Patent Application No. P202030585, filed on Jun. 17, 2020, which is incorporated herein by reference.

TECHNICAL FIELD

The object of the present invention is a pressure and temperature measuring device for measuring pressures and temperatures inside tanks containing a fluid or inside pipes that transport a fluid.

The pressure measuring device object of the present invention provides a solution of great compactness and simplicity of assembly that facilitates its installation and use in locations that are difficult to access for the operators in charge of the installation and/or maintenance of pressure measuring devices.

The pressure measuring device object of the present invention is applicable in the industry for the design and manufacture of sensor devices, as well as in industries that involve the transport and/or storage of fluids where the pressure of said fluids has to be controlled inside pipes or tanks.

STATE OF THE ART

Due to the sharp increase in demands regarding energy efficiency and reduction of the level of emissions in motor vehicles, the number of pressure and temperature type variables that it is necessary to measure in motor vehicles has been increasing for some years now, both in those exclusively powered by thermal engines such as hybrids or even pure electric vehicles, which has led to a very significant increase in the number of pressure and temperature sensors to be installed in all types of motor vehicles, as well as agricultural and construction machinery. This increase in demands has also led to the appearance of combined devices capable of measuring more than one variable, for example, pressure and temperature, in a compact format.

In the case of application to on-board systems in vehicles, such as thermal engines, fuel cells, air conditioning systems using pressurised gas, etc., there are typically severe space limitations that require sensors mounted in such systems to be as small and compact as possible.

Thus, for example, sensor designs structured around an outer casing that has a threaded coupling on one side to connect it to the tank, pipe, or application system, in which there circulates the medium the pressure and temperature parameters of which are desired to be known, and on the opposite side a plinth shaped like an electrical connector, for the connection of the device either to a controller or to a signalling element, or a combination of both, are common.

The outer casing typically has a hexagonal shape, like a screw head, which is used to couple a tool provided with a hexagonal socket compatible with the measurements of said outer casing, in order to be able to carry out tightening and loosening operations of the threaded hydraulic connection through which the sensor device is coupled to the system and to the medium to be measured.

A majority of commercialised embodiments to date are distinguished by the fact that the separation between faces of said hexagonal head is about 24 or even 27 mm, presenting problems of lack of space in an increasing number of drive implantations and on-board systems. For this reason, vehicle and on-board system manufacturers demand an increasing reduction in the distance between faces of the hexagonal casing, the proposed objective being that of about 21 mm, often unattainable, with constructions that are part of the state of the art, inasmuch as the pressure-sensitive element is often arranged perpendicular to the major axis of the sensor, and therefore determines the minimum circumscribed circle on which the hexagonal faces can be applied; this configuration is known from EP 2559987 A1.

OBJECT OF THE INVENTION

In order to solve the aforementioned drawbacks, the present invention relates to a pressure and temperature measuring device.

The pressure and temperature measuring device comprises a pressure-sensitive element, an electronic circuit board, connection pins (for connection to external measuring equipment or an antenna for data transmission) and a casing.

The casing comprises a central body and a connecting section configured to connect to a tank, reservoir or pipe comprising a fluid.

The device comprises a conduit that allows a fluid connection between the fluid in the tank/reservoir/pipe and the pressure-sensitive element.

The casing comprises a substantially prismatic and/or cylindrical elongated geometry defining a longitudinal axis (A).

In a novel way, the device comprises a base part with an elongated geometry, where said base is configured to be arranged along the longitudinal axis (A) inside the casing.

The base comprises a partition, a back, a platform and a plinth.

The partition comprises an inner plane oriented towards the back and parallel to the longitudinal axis (A) and an outer plane that forms an acute angle with the inner plane.

The back, the platform and the inner plane of the partition define a slot oriented according to a plane parallel to the longitudinal axis (A) and configured to receive the electronic circuit board.

For its part, the outer plane of the partition defines a support surface inclined with respect to the longitudinal axis (A) and configured to serve as a support, together with the plinth, to support the pressure-sensitive element.

The outer surface of the partition comprises an opening that gives way to the conduit.

The configuration of the device described above provides great compactness allowing the dimensions of the device in a radial dimension to be reduced, as the pressure-sensitive element and the electronic circuit board are arranged in the direction of the longitudinal axis (A), instead of transversely as in known embodiments.

According to a preferred embodiment, the pressure measuring device incorporates a sleeve configured to cover the pressure-sensitive element, the partition, the slot, the electronic circuit board and the back, creating an armour between said elements and the casing.

Thus, a compact body is created that protects the elements housed inside the sleeve, providing security and compactness for the subsequent assembly of the casing and ensuring that the elements inside the sleeve do not move beyond the limits established by said sleeve.

Preferably, the base incorporates a stem with a first section configured to be arranged inside the connection section of the casing, said first section of the stem being flush with the casing. The mentioned conduit runs through the inside of said first section of the stem. With this geometry and arrangement, assembly is facilitated since the first section of the stem fits perfectly into the end section of the casing.

According to a preferred embodiment, the stem comprises a second section that extends beyond the connection section of the casing. The base has a cavity arranged according to the longitudinal axis (A). Said cavity runs alone along the second section of the stem, while running parallel to the conduit along the first section of the stem. The cavity presents its blind (closed) end towards the inside of the tank/reservoir/pipe. Said cavity is configured to receive a shaft of the electronic circuit board, where said shaft comprises a temperature sensor.

Thus, it is possible to have a device that, together with the pressure measurement, also provides a measurement of the fluid temperature, further allowing great ease of assembly by simply sliding the shaft of the electronic circuit board inside the cavity for the stem of the base, achieving a compact device that combines pressure and temperature measurement suitable for locations where there are problems of a lack of space to install the device Preferably, the pressure measuring device incorporates a contact device configured to allow an electrical connection between the electronic circuit board and the casing. Thus, added electrical safety is provided that allows the integrity of the electronic circuit board to be preserved against possible unwanted electrical derivations, and also provides added safety to the operator who has to manipulate the pressure measuring device.

According to a possible embodiment, the contact device is made by means of a spring arranged inside a guide of the base. According to this embodiment, when the electronic circuit board is inserted into the slot in the base, the board contacts the spring that protrudes from one end of the guide, while said spring protrudes from the other end of the guide (at one side of the platform of the base) and contacts the casing.

This configuration of the contact device provides simplicity in the manufacture of the electronic circuit board and the contact device, which can be manufactured as separate elements and easily mounted on the base.

According to an alternative embodiment, the contact device is made in the form of a strip (or plate) fixed to the electronic circuit board and configured to contact the casing when the electronic circuit board is inserted into the slot of the base.

Although the configuration mentioned in the previous paragraph implies greater complexity in the manufacture of the electronic circuit board, it allows assembly tasks to be facilitated by having fewer separate parts.

According to a preferred embodiment, the connection pins comprise a first end section configured for connection with the electronic circuit board and a second end section for connection with an external reading device. The first end section comprises a "C"-shaped geometry, with a first branch of the "C" shape configured for connection to the electronic circuit board and a second branch of the "C" shape attached to the second end section of the connection pins.

The geometry of the connection pins described above causes them to be formed form like a "staple", allowing the electronic circuit board to be fixed to some other element of the device, resulting in a firmer assembly and avoiding relative displacements of the electronic circuit board with respect to the connection pins and other elements of the device.

According to a possible embodiment, the first branch of the "C" shape is configured to contact the electronic circuit board by being inserted through perforations made in the partition and through holes in the electronic circuit board, the second branch of the "C" shape being embedded in notches in the partition.

This configuration allows the electronic circuit board to be firmly fixed to the partition, effectively ensuring that the electronic circuit board cannot move relative to the partition.

According to an alternative embodiment, the first branch of the "C" shape is configured to contact the electronic circuit board by being inserted through orifices in the sleeve until contacting the electronic circuit board, the second branch of the "C" shape being embedded in grooves of the sleeve.

This arrangement allows the assembly, once the pressure-sensitive element and the electronic circuit board have been placed, to be taken in by means of the sleeve so that, once the compactness of the assembly is assured, the pins can be inserted without the danger of some element (e.g. the pressure-sensitive element) becoming dislodged during the manoeuvre for inserting the pins.

Preferably, the pressure measuring device incorporates elastic contact elements housed inside concavities in the partition. These elastic contact elements are configured to apply pressure action on the pressure-sensitive element, allowing the pressure-sensitive element to always remain in continuous electrical contact.

According to a possible embodiment, the concavities of the elastic contact elements are located close to the plinth. The pressure-sensitive element comprises a flat edge configured to be arranged in correspondence with the plinth (resting on the plinth) and a curved edge configured to fit together with stops.

This arrangement described above allows a very firm clamping of the pressure-sensitive element between the plinth and the stops.

According to an alternative embodiment, the concavities of the elastic contact elements are located at one end of the partition opposite the plinth. The pressure-sensitive element comprises a curved edge configured to be arranged in correspondence with the plinth and a flat edge configured to be arranged in correspondence with said end of the partition opposite the plinth.

The arrangement described above allows a greater degree of inclination of the outer plane of the partition with respect to the inner plane and, therefore, allows greater compactness of the pressure measuring device in the axial direction (in the direction of the longitudinal axis (A)).

Preferably, the pressure measuring device comprises a connector part or element. Said connector comprises a central area configured to be arranged on the sleeve, a connection nozzle configured to be arranged around the connection pins and a tab (or wedge) configured to be arranged trapped between the sleeve and the pressure-sensitive element, applying pressure action against the pressure-sensitive element, the pressure-sensitive element being trapped between the tab and the partition.

The configuration described in the previous paragraph allows an extraordinary firmness in the fixing of the pressure-sensitive element, which is retained between the partition and the tab.

Preferably, the device incorporates at least one sealing gasket trapped between the pressure-sensitive element and the outer plane of the partition and surrounding the opening in a leak-tight manner to prevent the fluid entering the opening from escaping beyond the limits marked by the sealing gasket. Thus, the retentive force of the tab against the partition (optionally with the collaboration of the inner part of the sleeve which helps to keep the tab pressing the pressure-sensitive element against the partition) cooperates to maintain (thanks to the sealing gasket) the leak-tightness around the opening.

According to a preferred embodiment of the pressure measuring device, the partition comprises a housing in which the opening is defined. Thus, when the pressure-sensitive element is supported on the partition, the housing is covered by the pressure-sensitive element, the pressure-sensitive element and the housing of the partition thus defining a chamber configured to be flooded by the fluid.

In this way, it is possible to provide a larger contact surface of the fluid with the pressure-sensitive element, which assures a correct measurement of the fluid pressure.

DESCRIPTION OF THE FIGURES

The following figures have been included as part of the explanation of at least one embodiment of the invention.

FIG. 1c shows a rear perspective view of the pressure measuring device of FIG. 1a.

FIG. 1d shows a front perspective view of the base of the pressure measuring device of FIG. 1a.

FIG. 5a shows a perspective view of an embodiment of a casing of the pressure measuring device.

FIG. 5b shows a sectional view of the casing of FIG. 5a.

FIG. 6b shows a perspective view of the pressure and temperature measuring device of FIG. 6a.

FIG. 7c shows a sectional view of the second alternative practical embodiment of the pressure and temperature measuring device of FIG. 7a.

FIG. 9b shows a sectional view of the pressure measuring device of FIG. 9a.

DETAILED DESCRIPTION OF THE INVENTION

Figure 1A:
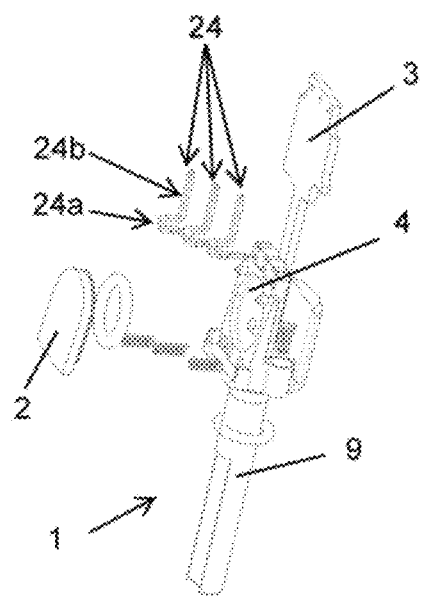
FIG. 1a shows an exploded front perspective view of a preferred embodiment of the pressure and temperature measuring device object of the invention, where the sleeve and the casing of the pressure measuring device are not shown.
Figure 1B:
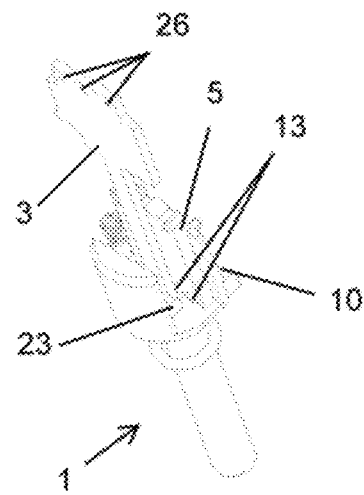
FIG. 1b shows an exploded rear perspective view of the pressure measuring device of FIG. 1a, where the contact pins of the pressure measuring device, the pressure-sensitive element, the elastic contact elements of the sensor and the O-ring are not shown.
Figure 1C:
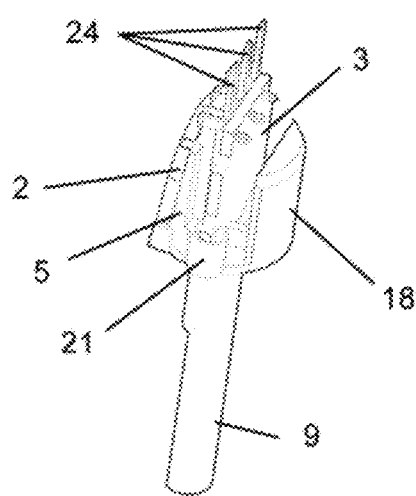
Figure 1D:
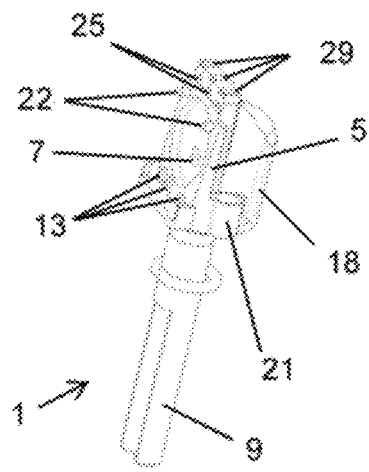

As mentioned above, the present invention relates to a pressure and temperature measuring device.

According to a first preferred practical embodiment, as seen in FIG. 1a, FIG. 1b, FIG. 1c and FIG. 1d, the device has a base (1) or internal structural element. A pressure-sensitive element (2) and an electronic circuit board (3) are arranged in said base (1).

The pressure-sensitive element (2) is arranged supported on a plinth (10) of the base (1) and also supported on a partition (5) of the base (1). In said partition (5) there is a housing (4) or niche, so that the pressure-sensitive element (2) offers one of its faces (the face whereby it rests against the partition (5)) towards said housing (4).

The partition (5) has stops (22) or projections located above the housing (4) and configured to facilitate a correct positioning of the pressure-sensitive element (2) in the base (1), so that the pressure-sensitive element (2) is thus located between the plinth (10), the partition (5) and the stops (22). The stops (22) contact an upper rounded part of the pressure-sensitive element (2).

Figure 2A:
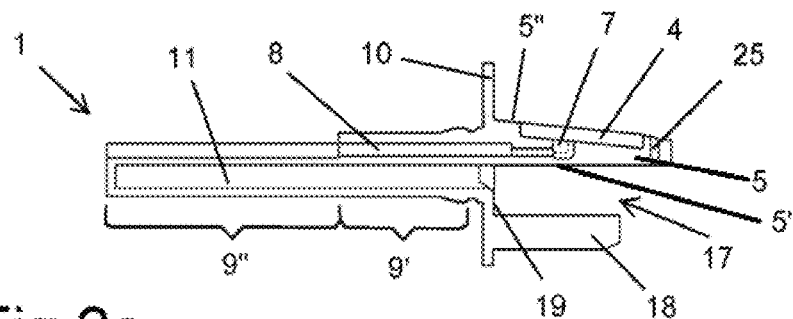
FIG. 2a shows a sectional view of the base of the pressure measuring device of FIG. 1d.

The housing (4) is in fluid connection (see FIG. 2a) with the fluid inside the tank/reservoir/pipe (not depicted) by means of an opening (7) that communicates with a conduit (8) that runs inside of a stem (9) of the base (1), said conduit (8) being open towards the inside of the tank/reservoir/pipe. Therefore, said housing (4) is configured to be flooded by the fluid from the tank/reservoir/pipe. A sealing gasket (6) configured to prevent leakage of the fluid from the housing (4) to other parts of the pressure measuring device is preferably located in said housing (4).

The stem (9) is preferably made of a plastic material. More preferably, the entire base (1) is made of a plastic material.

The stem (9) can have a cylindrical or prismatic geometry.

The stem (9) extends beyond the length of the conduit (8). It can be seen in FIG. 2a how said stem (9) comprises a cavity (11) that runs through the inside thereof. This cavity (11) is not in fluid connection with the fluid inside the tank/reservoir/pipe.

Figure 6A:
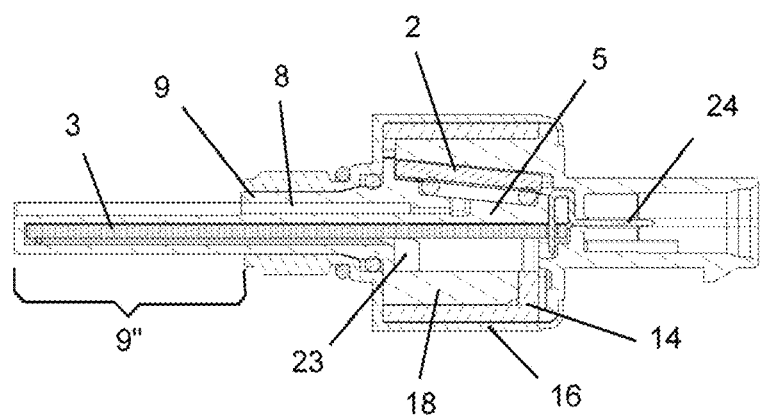
FIG. 6a shows a sectional view of the first preferred practical embodiment of the pressure and temperature measuring device of FIG. 1a fully mounted with the sleeve, the connector and the casing.

There is therefore a first section (9') of the stem (9) through which the conduit (8) and the cavity (11) run parallel, and a second section (9") of the stem (9) where only the cavity (11) runs until reaching a blind end of the stem (9), closed with respect to the inside of the tank/reservoir/pipe. The first section (9') of the stem (9) is covered (see FIG. 6a) by the casing (16) of the device while the second section (9") of the stem (9) is exposed, projecting into the tank/reservoir/pipe.

The pressure-sensitive element (2) is coupled to the base (1) with the intermediation (see FIG. 3) of elastic contact elements (12) housed inside concavities (13) of the base (1) to establish continuous electrical contact, said elastic contact elements (12) being able to be in the form of helical springs, plugs of a conductive elastomer, etc. These concavities (13) are located below the housing (4).

According to a possible form of design, the concavities (13) for housing the elastic contact elements (12) are pass-through (see FIG. 1b) and traverse the partition (5), so that said elastic contact elements can press against the electronic circuit board (3) and make electrical contact with it for the transmission of pressure data.

The base (1) comprises the partition (5), a platform (19), a back (18) and a slot (17) located between the partition (5), the back (18) and the platform (19). The slot (17) is configured to receive the electronic circuit board (3).

Figure 2B:
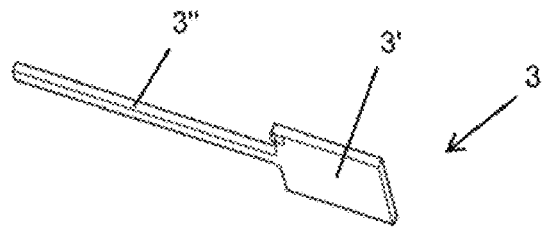
FIG. 2b shows a perspective view of a possible embodiment of the electronic circuit board of the pressure measuring device.

The electronic circuit board (3) (depicted in FIG. 2b) comprises a central body (3') and a shaft (3"). The central body (3') is inserted in the slot (17) and the shaft occupies the cavity (11) inside the stem (9). The shaft (3") comprises a temperature sensor embedded in the electronic circuit board (3). Therefore, the device allows both the pressure and the temperature of the fluid inside the tank/reservoir/pipe to be measured. The temperature sensor is located at the end area of the shaft (3"), in the area farthest away from the platform (19) of the base (1).

The electronic circuit board (3) can be made in the form of a printed circuit board (PCB).

A contact device (20) allows the electrical connection of the electronic circuit board (3) with the casing (16).

Figure 3:
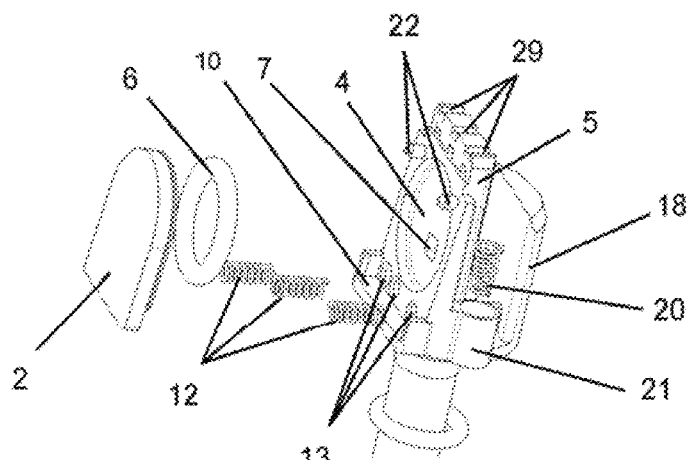
FIG. 3 shows an exploded perspective view of the upper part of the pressure measuring device of FIG. 1a, where the electronic circuit board is not shown and where the elastic contact elements and the orifices in the base where said elastic contact elements are inserted are shown in greater detail.

As can be seen in FIG. 3, said contact device (20) is made in the form of a spring located in a guide (21) open at both ends, so that the spring contacts in its upper part the electronic circuit board (3) and in its lower part the casing (16).

The base (1) comprises flanges (23) projecting from the back (18) into the slot (17). Said tabs are configured to allow the correct positioning and correct fixing of the electronic circuit board (3) inside the slot, so that when the electronic circuit board (3) has been fully inserted into the slot (17) abutting against the platform (19), the tabs (23) exert certain pressure against the electronic circuit board (3) so that the electronic circuit board (3) is trapped between the partition (5) and the tabs (23). The tabs (23) also facilitate a correct guidance in the insertion of the electronic circuit board (3) to facilitate the subsequent insertion of connection pins (24).

For the electrical connection of the pressure measuring device with an external reading device (pressure and optionally also temperature measurements of the fluid) there are connection pins (24).

According to a preferred embodiment, said connection pins (24) comprise a first end section (24a) for connection with the electronic circuit board (3) and a second end section (24b) for connection with the external reading device or with the antenna. The first end section (24a) comprises a "C"-shaped geometry, with a first branch (24a') of the "C" shape for connection with the electronic circuit board (3) and a second branch (24a") of the "C" shape attached to the second end section (24b) of the connection pins (24).

Said connection pins (24) are configured to connect to the electronic circuit board (3) from the front of the base (3), accessing the electronic circuit board (3) through perforations (25) located above the housing (4) of the partition (5). The connection pins (24) go through the electronic circuit board (3) through holes (26) in its upper part (see FIG. 1c and FIG. 6a). In this way, in addition to allowing electrical connection with an external reading device or with an antenna, the connection pins (24) also exert a retentive action of the electronic circuit board (3) against the partition (5), ensuring its correct positioning and preventing its lateral displacement once the connection pins (24) have been inserted in the perforations (25) and in the holes (26) of the electronic circuit board (3).

The first end section (24a) of the connection pins is located with the first branch (24a') of the "C" shape inserted in the perforations (25) and in the holes (26) and with the second branch (24a") of the "C" shape embedded in notches (29) of the partition (5), located above the perforations (25).

Figure 4A:
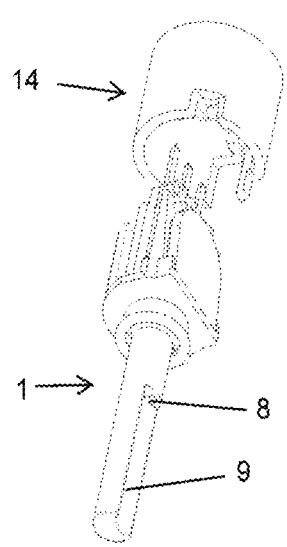
FIG. 4a shows an exploded front perspective view of the device of FIG. 1a, which includes a sleeve of the device arranged for mounting.
Figure 4B:
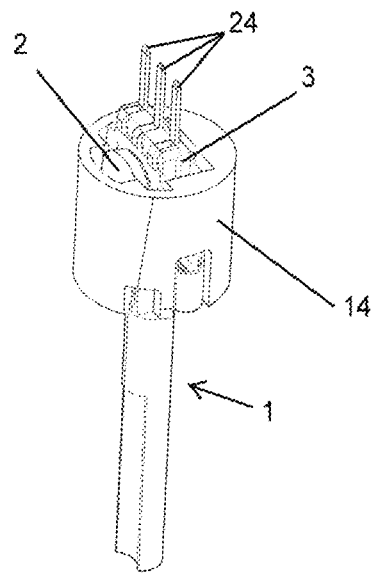
FIG. 4b shows a front perspective view of the device of FIG. 1a, with the sleeve already mounted.

Preferably, the pressure measuring device comprises (see FIG. 4a and FIG. 4b) a sleeve (14) configured to be inserted through the upper part of the base (1) and to cover the pressure-sensitive element (2), the partition (5), the slot (17), the electronic circuit board (3) and the back (18); that is, the sleeve (14) is configured to cover all the elements that are part or that are installed in the base (1), leaving only the stem (9) that projects in the lower portion below the platform (19) uncovered.

Thus, the sleeve (14) fulfils a protection function for the elements installed in the base (1) (pressure-sensitive element (2) and electronic circuit board (3)) thus creating a more compact assembly.

Figure 4C:
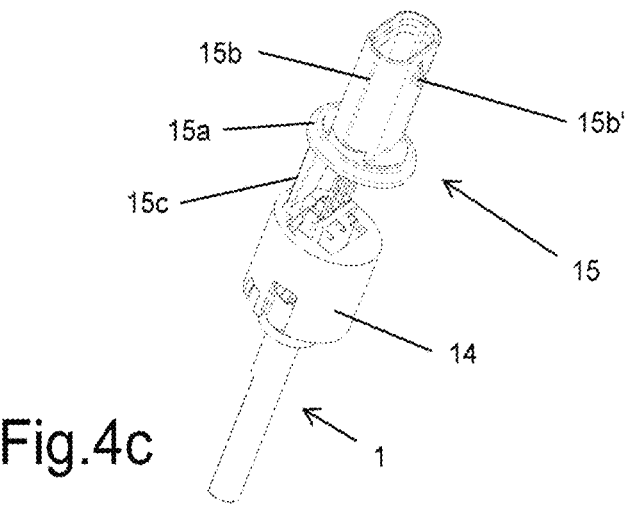
FIG. 4c shows an exploded rear perspective view of the device with the sleeve of FIG. 4b, with a connector of the device arranged for mounting.
Figures 5A, 5B:
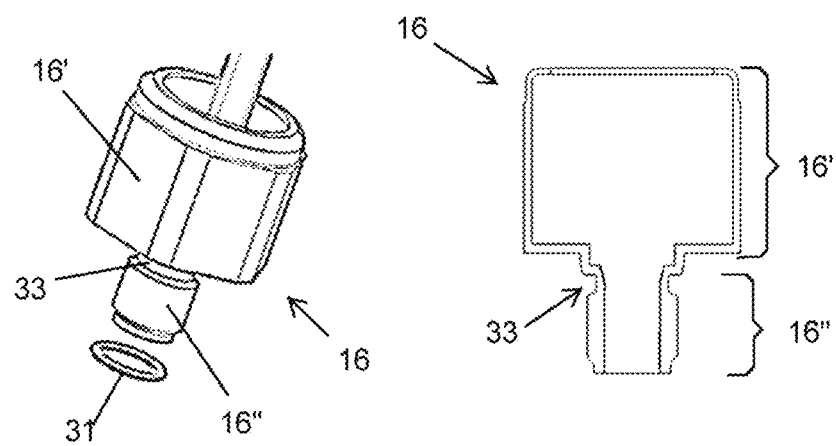

As has also been described, the pressure measuring device comprises (see FIG. 4c) a connector (15). This connector comprises a central area (15a), a connection nozzle (15b) and a tab (15c) or wedge.

Once the connector (15) is installed, the central area (15a) is arranged on the sleeve (14), the connection nozzle (15b) is arranged around the second end section (24b) of the connection pins (24) and the tab (15c) is trapped between the sleeve (14) and the pressure-sensitive element (2), applying a pressing action against the pressure-sensitive element (2), and it is trapped between the tab (15c) and the partition (5).

Lastly, the pressure and temperature measuring device has a casing (16) configured to cover the first section (9') of the stem (9) as well as the sleeve (14). Thus, the casing (16) protects and provides compactness to the device. The casing (16) is preferably metallic.

The casing (16) comprises a central body (16') and a connecting section (16"). The central body (16') is configured to cover the sleeve (14) while the connection section (16") is configured to cover the first section (9') of the stem (9) of the base (1).

The connection section (16") of the casing (16) is preferably threaded to allow its threaded connection with the corresponding orifice of the tank/reservoir/pipe.

Figure 6B:
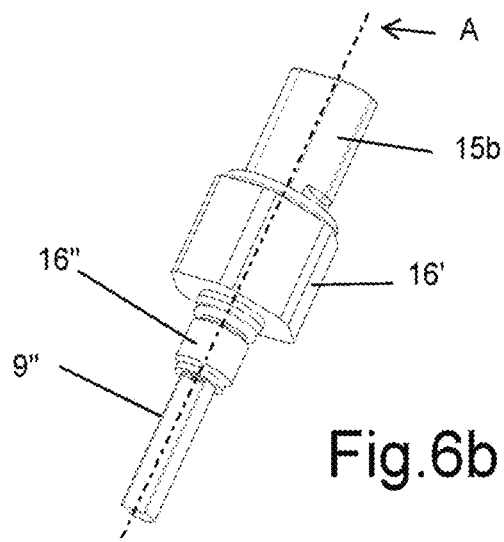

Thus, once the casing (16) is assembled, the pressure measuring device presents (see FIG. 6b) an almost complete radial symmetry, where the visible parts of the device are the central body (16') of the casing (16), the connection section (16") of the casing (16) and the connection nozzle (15b) of the connector (15). Likewise, the second section (9") of the stem (9) of the base (1) projects beyond the connection section (16") of the casing (16) and is therefore also a visible part of the device.

It can therefore be mentioned that there is a longitudinal axis (A) of the device (in relation to which the terms up, down, upper, lower have been used) which at the same time signifies an axis of (approximate) radial symmetry, with the exception of that which refers to the second section (9") of the stem and the connection nozzle (15b) of the connector (15), which has an upper tooth (15b') on one of its sides that constitutes an element of radial asymmetry.

Preferably, the stem (9) has a complete cylindrical geometry (optionally, as already mentioned, it can be prismatic) in its first section (9') and a cylindrical geometry with a longitudinal truncation plane (or a cylindrical truncation surface, as seen in the figures) in the second section (9"). Thus, a staggering occurs between the first section (9') and the second section (9") of the stem, in which staggering the conduit (8) protrudes into the tank/reservoir/pipe (see FIG. 4a).

The partition (5) has a trapezoidal shape with an inner plane (5') directed towards the electronic circuit board (3) and an outer plane (5") directed towards the pressure-sensitive element (2). The inner plane (5') is parallel to the longitudinal axis (A) of the device while the outer plane (5") has a certain degree of inclination with respect to the longitudinal axis (A) of the device. The outer plane (5") thus forms a certain acute angle with respect to the inner plane (5') of the partition (5). This inclination of the outer plane (5") with respect to the longitudinal axis (A) of the device facilitates the positioning of the pressure-sensitive element (2), simply by supporting said pressure-sensitive element (2) on the plinth (10) and letting it rest on the outer plane (5") of the partition (5).

It should also be noted that the casing (16) preferably comprises an annular recess (33) between the central body (16') and the connection section (16"), said recess being configured to receive a sealing gasket (31).

A second sealing gasket (32) can also be arranged below the platform (19) of the base (1), between the casing (16) and the first section (9') of the rod (9).

Figures 7A, 7B:
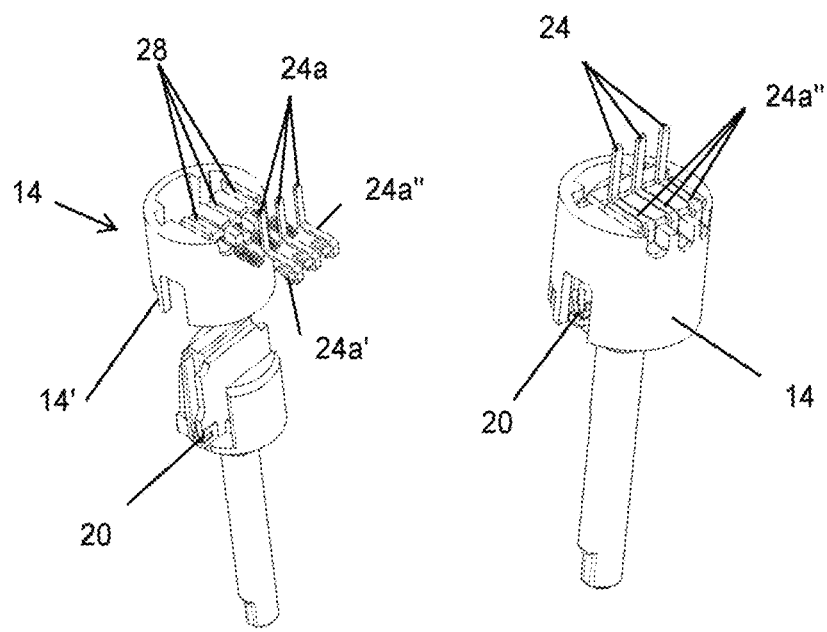
FIG. 7a shows a rear exploded perspective view of a second alternative practical embodiment of the pressure and temperature measuring device, where the casing of the device is not depicted.
FIG. 7b shows a rear perspective view of the pressure and temperature measuring device of FIG. 7a, where the sleeve is shown mounted on the base and where the casing of the device is not depicted.
Figure 7C:
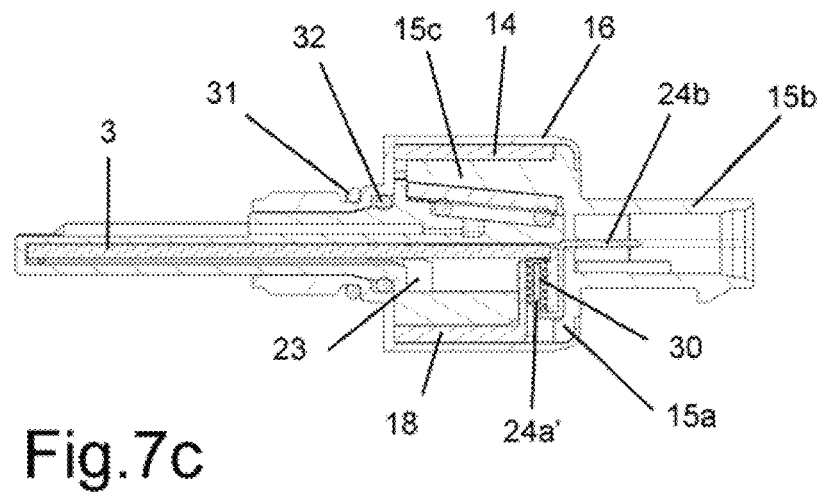

According to a second alternative practical embodiment of the pressure and temperature measuring device (see FIG. 7a, FIG. 7b), the contact device (20) is made in the form of a strip that opens its way through a nick (14') of the sleeve (14) of the device to allow the electrical connection between the electronic circuit board (3) and the casing (16) of the device.

Furthermore, for this second embodiment of the pressure and temperature measuring device, the connection pins (24) are connected to the electronic circuit board (3) from the rear part of the base (1), without going through said base (1) and (preferably) without going through the electronic circuit board (3), but only abutting against the electronic circuit board (3). The pins are inserted through orifices (27) located at the upper and rear part of the sleeve (14).

As a design alternative, in this second embodiment, the first end section (24a) of the connection pins (24) is located with the first branch (24a') of the "C" shape inserted into the orifices (27) of the sleeve (14) and contacts the electronic circuit board (3) with the intermediation of elastic elements (30) or springs configured to maintain a continuous electrical connection. For its part, the second branch (24a") of the "C" shape is embedded in grooves (28) of the sleeve (14), above the orifices (27).

Figure 8:
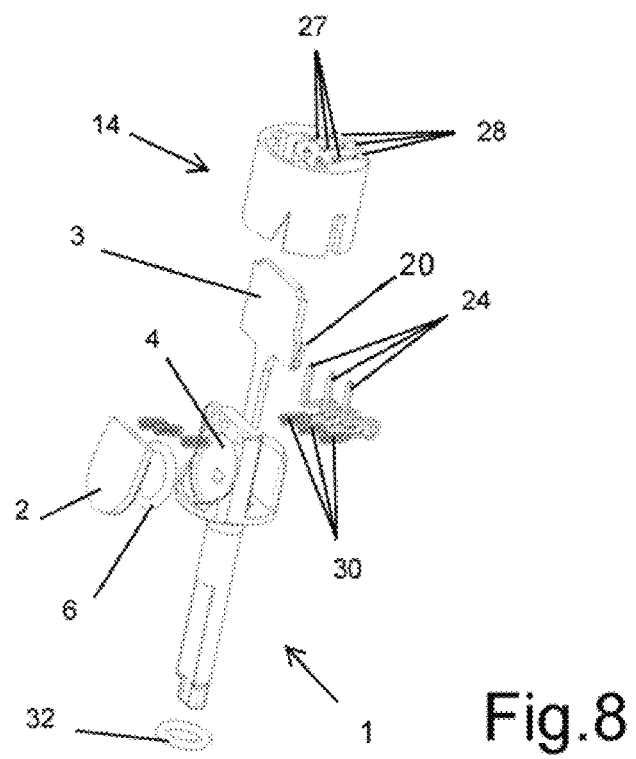
FIG. 8 shows an exploded front perspective view of a third alternative embodiment of the pressure and temperature measuring device with the rounded part of the pressure-sensitive element in correspondence with the plinth.

According to a third alternative practical embodiment (see FIG. 8), unlike the second embodiment in which the partition (5) lacks stops (22) and in which the concavities (13) for housing the elastic contact elements (12) are arranged above the housing (4) and not below it, as was the case in the first and second embodiments. Likewise, the rounded part of the pressure-sensitive element (2) is located in the lower part and not in the upper part, as was the case in the second embodiment. In this third embodiment of the measuring device, this configuration allows the outer plane (5") of the partition (5) to be more inclined or leaning towards the horizontal, that is, the acute angle between the outer plane (5") and the inner plane (5') of the partition (5) is more open. This allows the overall height of the pressure measuring device to be reduced.

Figure 9A:
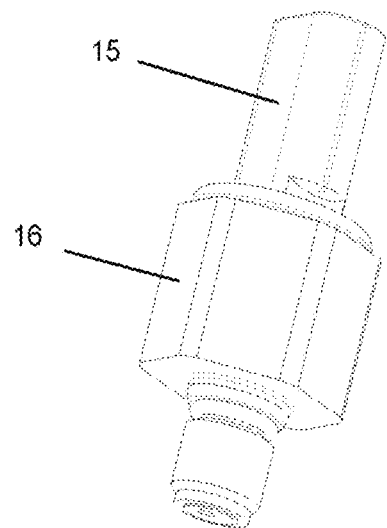
FIG. 9a shows a perspective view of a fourth alternative practical embodiment of the pressure measuring device in this case without including a temperature sensor.
Figure 9B:
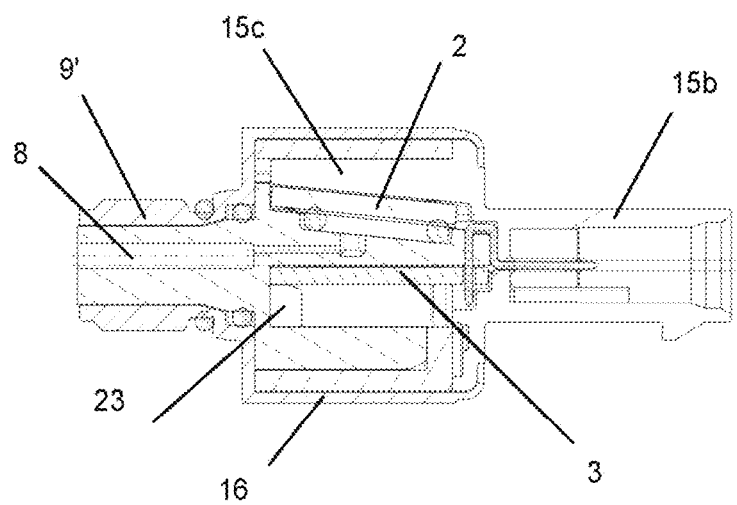

According to a fourth practical embodiment (FIG. 9a and FIG. 9b) of the measuring device, in this case the device lacks a temperature sensor and, therefore, the electronic circuit board (3) lacks a shaft (3"). In this embodiment, the stem (9) of the base (1) of the device lacks a second section (9") and lacks a cavity (11), with only a first section (9') that is completely covered by the casing (16) of the device. The conduit (8) runs inside the stem (9) and connects the inside of the tank/reservoir/pipe with the housing (4).

The invention claimed is:

1. A pressure and temperature measuring device comprising:
    a pressure-sensitive element, an electronic circuit board, connection pins and
    a casing, wherein the casing comprises a central body and a connection section configured to connect to a tank, reservoir or pipe that comprises a fluid,
    a conduit that allows a fluid connection between the fluid and the pressure-sensitive element,
    wherein the casing comprises a substantially prismatic and/or cylindrical elongated geometry defining a longitudinal axis, a base with an elongated geometry, wherein the base is configured to be arranged according to the longitudinal axis inside the casing, and
    wherein the base comprises a partition, a back, a platform and a plinth, wherein the partition comprises an inner plane oriented towards the back and parallel to the longitudinal axis and an outer plane that forms an acute angle with the inner plane, wherein the back, the platform and the inner plane of the partition define a slot oriented according to a plane parallel to the longitudinal axis and configured to receive the electronic circuit board, and wherein the outer plane of the partition defines a support surface inclined with respect to the longitudinal axis and configured to serve as a support together with the plinth for the pressure-sensitive element, wherein the outer surface of the partition comprises an opening that gives way to the conduit.

2. The pressure measuring device according to claim 1, comprising a sleeve configured to cover the pressure-sensitive element, the partition, the slot, the electronic circuit board and the back creating an armour between said elements and the casing.

3. The pressure measuring device according to claim 2, wherein the first branch of the "C" shape is configured to contact the electronic circuit board by being inserted through orifices of the sleeve until contacting the electronic circuit board, the second branch of the "C" being embedded in grooves of the sleeve.

4. The pressure measuring device according to claim 2, comprising a connector with a central area configured to be arranged on the sleeve, a connection nozzle configured to be arranged around the connection pins and a tab configured to be trapped between the sleeve and the pressure-sensitive element, applying pressure action against the pressure-sensitive element, the pressure-sensitive element being trapped between the tab and partition.

5. The pressure measuring device according to claim 1, wherein the base comprises a stem with a first section configured to be arranged inside the connection section of the casing, being flush with the casing, where the conduit runs inside said first section of the stem.

6. The pressure measuring device according to claim 5, wherein the stem comprises a second section that extends beyond the connection section of the casing, where the base has a cavity arranged according to the longitudinal axis, where said cavity runs alone along the second section of the stem and runs parallel to the conduit along the first section of the stem, where the cavity presents its blind end towards the inside of the tank/reservoir/pipe, where said cavity is configured to receive a shaft of the electronic circuit board, where said shaft comprises a temperature sensor.

7. The pressure measuring device according to claim 1, comprising a contact device configured to allow an electrical connection between the electronic circuit board and the casing.

8. The pressure measuring device according to claim 7, wherein the contact device is made by means of a spring arranged inside a guide of the base.

9. The pressure measuring device according to claim 7, wherein the contact device is made in the form of a strip fixed to the electronic circuit board and configured to contact the casing when the electronic circuit board is inserted into the slot.

10. The pressure measuring device according to claim 1, wherein the connection pins comprise a first end section configured for connection with the electronic circuit board and a second end section for connection with an external reading device or with an antenna, where the first end section comprises a "C"-shaped geometry, with a first branch of the "C" shape configured for connection with the electronic circuit board and a second branch of the "C" shape joined with the second end section of the connection pins.

11. The pressure measuring device according to claim 10, wherein the first branch of the "C" shape is configured to contact the electronic circuit board by being inserted through perforations made in the partition and through holes of the electronic circuit board, the second branch of the "C" shape being embedded in notches of the partition.

12. The pressure measuring device according to claim 1, comprising elastic contact elements housed inside concavities of the partition, where said springs are configured to apply pressure action on the pressure-sensitive element to allow the pressure-sensitive element to maintain continuous electrical contact.

13. The pressure measuring device according to claim 12, wherein the concavities are located close to the plinth, and where the pressure-sensitive element comprises a flat edge configured to be arranged in correspondence with the plinth and a curved edge configured to fit together with stops.

14. The pressure measuring device according to claim 12, wherein the concavities are located at one end of the partition opposite the plinth, and where the pressure-sensitive element comprises a curved edge configured to be arranged in correspondence with the plinth and a flat edge configured to be arranged in correspondence with the end of the partition opposite the plinth.

15. The pressure measuring device according to claim 1, wherein the partition comprises a housing where the opening is defined, so that when the pressure-sensitive element is supported on the partition, the housing is covered by the pressure-sensitive element, the pressure-sensitive element and the housing of the partition thus defining a chamber configured to be flooded by the fluid.

* * * * *